(12) United States Patent
Menon et al.

(10) Patent No.: US 11,902,580 B2
(45) Date of Patent: Feb. 13, 2024

(54) LOW-LATENCY ONLINE PER-TITLE ENCODING

(71) Applicant: BITMOVIN, INC., San Francisco, CA (US)

(72) Inventors: Vignesh V. Menon, Klagenfurt am Wörthersee (AT); Hadi Amirpour, Klagenfurt am Wörthersee (AT); Christian Timmerer, Klagenfurt am Wörthersee (AT)

(73) Assignee: BITMOVIN, INC., San Francisco, CA (US)

( * ) Notice: Subject to any disclaimer, the term of this patent is extended or adjusted under 35 U.S.C. 154(b) by 16 days.

(21) Appl. No.: 17/544,986

(22) Filed: Dec. 8, 2021

(65) Prior Publication Data

US 2023/0179800 A1 Jun. 8, 2023

(51) Int. Cl.
| | |
|---|---|
| *H04N 19/61* | (2014.01) |
| *H04N 19/119* | (2014.01) |
| *H04N 19/30* | (2014.01) |
| *H04N 19/196* | (2014.01) |
| *H04N 19/625* | (2014.01) |
| *H04N 19/115* | (2014.01) |
| *H04N 19/172* | (2014.01) |
| *H04N 19/423* | (2014.01) |

(52) U.S. Cl.
CPC .......... *H04N 19/61* (2014.11); *H04N 19/115* (2014.11); *H04N 19/119* (2014.11); *H04N 19/172* (2014.11); *H04N 19/197* (2014.11); *H04N 19/30* (2014.11); *H04N 19/423* (2014.11); *H04N 19/625* (2014.11)

(58) Field of Classification Search
CPC .... H04N 19/61; H04N 19/115; H04N 19/119; H04N 19/172; H04N 19/197; H04N 19/30; H04N 19/423; H04N 19/625
See application file for complete search history.

(56) References Cited

U.S. PATENT DOCUMENTS

| | | | |
|---|---|---|---|
| 10,735,739 B2 * | 8/2020 | Mao | .................. H04N 19/463 |
| 2014/0348246 A1 * | 11/2014 | Fu | .................. H04N 21/44008 375/240.26 |

OTHER PUBLICATIONS

M. Bhat, J.-M. Thiesse and P. Le Callet, "A Case Study of Machine Learning Classifiers for Real-Time Adaptive Resolution Prediction in Video Coding," 2020 IEEE International Conference on Multimedia and Expo (ICME), Jul. 2020, pp. 1-6, doi: 10.1109/ICME46284.2020.9102934.*

(Continued)

*Primary Examiner* — Mohammed S Rahaman
(74) *Attorney, Agent, or Firm* — Marton Ribera Schumann & Chang LLP; Chien-Ju Alice Chuang; Hector J. Ribera (57) ABSTRACT

The technology described herein relates to online per-title encoding. A method for online per-title encoding includes receiving a video input, generating segments of the video input, extracting a spatial feature and a temporal feature, predicting bitrate-resolution pairs based on the spatial feature and the temporal feature, using a discrete cosine transform (DCT)-based energy function, and per-title encoding segments of the video input for the predicted bitrate-resolution pairs. A system for online per-title encoding may include memory for storing a set of bitrates, a set of resolutions, and a machine learning module configured to predict bitrate resolution pairs based on low-complexity spatial and temporal features.

15 Claims, 4 Drawing Sheets

(56) References Cited

OTHER PUBLICATIONS

V. V. Menon, H. Amirpour, M. Ghanbari and C. Timmerer, "Efficient Content-Adaptive Feature-Based Shot Detection for HTTP Adaptive Streaming," 2021 IEEE International Conference on Image Processing (ICIP), Sep. 2021, pp. 2174-2178, doi: 10.1109/ICIP42928.2021.9506092.*

M. King, Z. Tauber and Z. Li, "A New Energy Function for Segmentation and Compression," 2007 IEEE International Conference on Multimedia and Expo, 2007, pp. 1647-1650, doi: 10.1109/ICME.2007.4284983.*

H. Amirpour, C. Timmerer and M. Ghanbari, "PSTR: Per-Title Encoding Using Spatio-Temporal Resolutions," 2021 IEEE International Conference on Multimedia and Expo (ICME), 2021, pp. 1-6, doi: 10.1109/ICME51207.2021.9428247.*

J. De Cock, Z. Li, M. Manohara and A. Aaron, "Complexity-based consistent-quality encoding in the cloud," 2016 IEEE International Conference on Image Processing (ICIP), 2016, pp. 1484-1488, doi: 10.1109/ICIP.2016.7532605.*

A. Zabrovskiy, P. Agrawal, C. Timmerer and R. Prodan, "FAUST: Fast Per-Scene Encoding Using Entropy-Based Scene Detection and Machine Learning," 2021 30th Conference of Open Innovations Association FRUCT, 2021, pp. 292-302, doi: 10.23919/FRUCT53335.2021.9599963.*

A. V. Katsenou, J. Sole and D. R. Bull, "Content-gnostic Bitrate Ladder Prediction for Adaptive Video Streaming," 2019 Picture Coding Symposium (PCS), Nov. 2019, pp. 1-5, doi: 10.1109/PCS48520.2019.8954529.* https://netflixtechblog.com/dynamic-optimizer-a-perceptual-video-encoding-optimization-framework-e19f1e3a277f; Netflix Technology Blog; Mar. 5, 2018.*

* cited by examiner

LOW-LATENCY ONLINE PER-TITLE ENCODING

BACKGROUND OF INVENTION

Video on demand (VoD) refers to pre-recorded content that internet-connected users can stream on-demand. HTTP Adaptive Streaming (HAS) has become the standard for rendering videos over the Internet. Current per-title encoding schemes encode the same video content at various bitrates and spatial resolutions to find an optimal bitrate ladder for each video content in a VoD application, where network heterogeneity and variability make a single resolution of the video content suboptimal.

In live streaming applications, however, a fixed resolution-bitrate ladder typically is used to avoid the additional encoding time complexity to find optimal resolution-bitrate pairs for every video content that has a low tolerance for latency of delay. Per-title encoding schemes are typically not deployed for live streaming applications due to high latency associated with the computational expense of determining convex hull. Even with existing methods of pre-analyzing video content or content-gnostic approaches, the latency associated with per-title encoding remains higher than acceptable ranges for live streaming. However, this often means delivering lower quality video when live streaming and a sub-optimal viewer experience, particularly if end user connection, software or device are not the highest quality.

Thus, it is desirable to have low-latency online per-title encoding for live streaming.

BRIEF SUMMARY

The present disclosure provides for techniques relating to online per-title encoding for live streaming. A method for online per-title encoding may include: receiving a video input; generating a plurality of segments of the video input; for at least one segment of the plurality of segments of the video input, extracting a spatial feature and a temporal feature; predicting a bitrate-resolution pairs based on the spatial feature and the temporal feature, using a discrete cosine transform (DCT)-based energy function, the bitrate-resolution pairs indicating an optimal resolution for each of a plurality of target bitrates; and per-title encoding the at least one segment for the predicted bitrate-resolution pairs. In some examples, the method also may include generating a target encoding set based on the predicted bitrate-resolution pairs for the per-title encoding the at least one segment. In some examples, predicting the bitrate-resolution pair includes computing a rate of decay using a video frame rate and a Menon Amirpour resolution scaling coefficient. In some examples, predicting the bitrate-resolution pair is further based on a number of video frames per second. In some examples, predicting the bitrate-resolution pair comprises a resolution scaling factor for each bitrate in a set of bitrates. In some examples, the set of resolution scaling factor ranges from 1/6 to 1. In some examples, the bitrate ranges from 145 kbps to 1.6 Mbps. In some examples, the spatial feature comprises a low-complexity spatial feature. In some examples, the temporal feature comprises a low-complexity temporal feature. In some examples, the spatial feature is determined as a function of a number of blocks per frame and a number of frames in the at least one segment. In some examples, the temporal feature is determined as a function of a sum of absolute differences of each frame's block-wise spatial energy compared to a previous frame's spatial energy. In some examples, the method also may include providing a live stream of the plurality of segments of the video input using the per-title encoding of the at least one segment.

A system for online per-title encoding may include: a memory comprising non-transitory computer-readable storage medium configured to store a set of bitrates and a set of resolutions; one or more processors configured to execute instructions stored on the non-transitory computer-readable storage medium to: receive a video input; generate a plurality of segments of the video input; for at least one segment of the plurality of segments of the video input, extract a spatial feature and a temporal feature; predict a bitrate-resolution pair based on the spatial feature and the temporal feature, using a discrete cosine transform (DCT)-based energy function; and per-title encode the at least one segment for the predicted bitrate-resolution pair. In some examples, the memory is further configured to store, and the one or more processors are further configured to implement, a machine learning module configured to perform the prediction of the bitrate-resolution pair. In some examples, the machine learning module is configured to receive as inputs at least a set of resolution scaling factors and a set of target bitrates. In some examples, the machine learning module is configured to receive as input a number of video frames per second of the video input. In some examples, the machine learning module is configured to determine a resolution scaling factor for each bitrate of the set of target bitrates. In some examples, the machine learning module comprises a neural network

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for live per-title encoding.

Per-title encoding is a form of encoding optimization that customizes a bitrate ladder of each video based on the complexity of the video file. Per-title encoding improves quality of experience (QoE) for users because selection of optimal bitrate-resolution pairs is content dependent (i.e., depends on the video content being streamed). Low-latency online per-title encoding to improve bitrate ladders online for live video streaming applications may be achieved using content-aware features—Discrete Cosine Transform (DCT) energy-based low-complexity spatial and temporal features—extracted to determine video segment characteristics. Based on these features, a low-complexity convex-hull prediction algorithm may be configured to predict an optimal resolution for each video segment at every target bitrate from a pre-defined set of resolutions for encoding, thereby achieving bitrate savings of over 20%, and even 30% or more in some cases, while maintaining the same or similar quality as typical per-title encoding (e.g., as measured by Peak Signal-to-Noise Ratio (PSNR) and/or Video Multimethod Assessment Fusion (VMAF)). Encodings may be selected based on the following criteria: a selected bitrate-resolution pair should be of the highest possible quality, and there should be a perceptual gap between adjacent selected bitrates.

Figure 1:
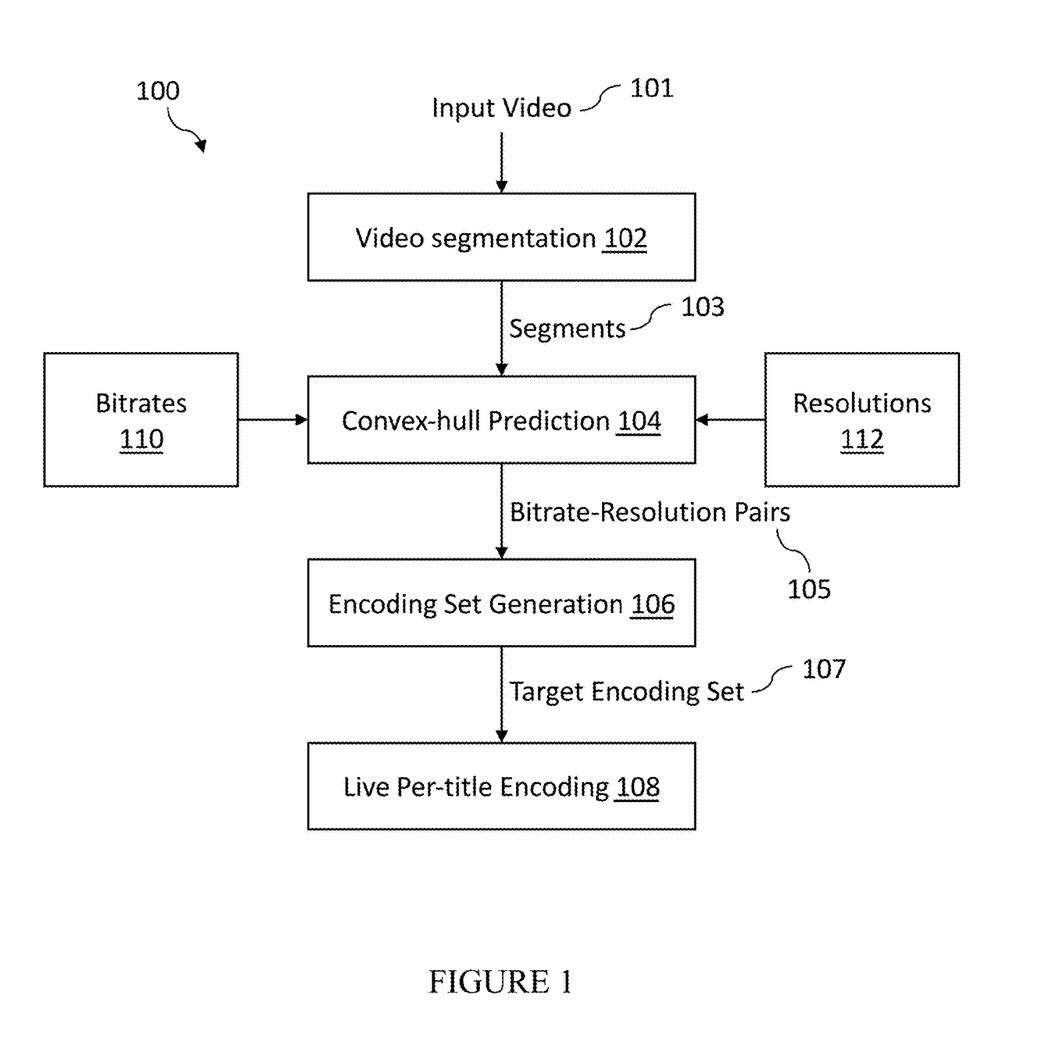
FIG. 1 is a simplified block diagram of an exemplary architecture of an online per-title encoding system, in accordance with one or more embodiments.

FIG. 1 is a simplified block diagram of an exemplary architecture of a live per-title encoding system, in accordance with one or more embodiments. Architecture 100 includes video segmentation module 102, convex-hull prediction module 104, encoding set generation module 106 and live per-title encoding module 108. Video segmentation module 102 may be configured to receive input video 101 and generate segments 103, for example, by dividing input video 101 into segments, making and storing copies of segments of video input 101, extracting segments from input video 101, or other methods. In some examples, input video 101 may include video content for a live streaming application. In some examples, segments 103 may include a plurality of segments of some or all of input video 101, each segment length being a couple seconds, a few seconds, tens of seconds, or other suitable length. In some examples, video segmentation 102 may be configured to generate a plurality of segments of equal or similar length. In other examples, the length of segments 103 may vary. Segments 103, along with characteristics (i.e., of content) of segments 103, may be provided to convex-hull prediction 104 configured to determine bitrate-resolution pairs 105 for encoding each segment.

Convex-hull prediction 104 may base a determination of bitrate-resolution pairs 105 on a given set of bitrates (i.e., qualities) 110 and resolutions 112. Convex-hull prediction 104 (e.g., a neural network or other machine learning model) may be configured to receive as input segments 103 and all, or any combination, of a number of video frames per second, a set of resolution scaling factors (e.g., ⅙, ⅕, ¼, ⅓, ½, ⅔, 1, the set sometimes including more or less resolution scaling factors, or s̃), and a set of target bitrates b. Convex-hull prediction 104 also may be configured to output bitrate-resolution pairs 105 comprising a resolution scaling factor as a function of a target bitrate for some or all bitrates in the set of bitrates 110 (e.g., s(b)∀b∈ B). A convex-hull for each of segments 103 may be predicted using spatial and temporal features of a given segment and the given set of bitrates 110 (e.g., 145 kbps, 450 kbps, 1.6 Mbps, the set sometimes including more or less bitrates) and resolutions 112 (e.g., 360p, 432p, 540p, 720p, 1080p, 1440p, 2160p, the set sometimes including more or less resolutions, and/or corresponding resolution scaling factors, as described above).

Thus, convex-hull prediction 104 may be configured to predict a convex-hull for each of segments 103 by extracting low-complexity spatial and temporal features from each segment and predicting an optimal resolution based on said low-complexity spatial and temporal features.

Selecting low-complexity features is helpful to low-latency video streaming without disruptions. For each segment, convex-hull prediction 104 may calculate at least two features—a spatial energy feature and an average temporal energy—including calculating an average texture energy and an average gradient of the texture energy using a DCT-based energy function. This example DCT-based energy function may be used to determine a block-wise texture of a frame:

$$H_{p,k} = \sum_{i=1}^{w}\sum_{j=1}^{w} e^{\left|\left(\frac{ij}{w^2}\right)^2 -1\right|}|DCT(i-1,j-1)|$$

Frame p has a block address k, and the block size is w×w pixels (e.g., 32×32 pixels, 64×64 pixels, or larger or smaller). In other examples, the block size may have a width w and a height/length λ, and the energy function may be a function of w×h instead of $w^2$. DCT(i,j) is the $(i,j)^{th}$ DCT component when i+j>2, and otherwise it is 0. Exponentially higher costs are assigned to higher DCT frequencies (e.g., caused by a mixture of objects). The texture is averaged to determine the spatial energy feature denoted as E:

$$E = \sum_{p=1}^{P}\sum_{k=1}^{C} \frac{H_{p,k}}{P*C*w^2}$$

In this function, C represents the number of blocks per frame, and P denotes a number of frames in the video segment. The blockwise SAD (i.e., sum of absolute differences) of the texture energy of each frame compared to its previous frame may be computed and averaged for each frame of the video to obtain an average temporal energy h:

$$h = \sum_{p=2}^{P}\sum_{k=1}^{C} \frac{SAD(H_{p,k}, H_{p-1,k})}{(P-1)*C*w^2}$$

Spatial feature value E and temporal feature value h may be used to predict an optimal resolution for every target bitrate (i.e., bitrate-resolution pairs) for each segment. A resolution prediction algorithm may use a scaling factor (s) for every resolution r:

$$s = \frac{W}{W_{max}}; r \in R$$

W denotes a width (e.g., in pixels) of the resolution r and $W_{max}$ represents a width of a maximum resolution of an input bitrate ladder (e.g., bitrates 110). S denotes a set of s corresponding to resolutions defined in R (e.g., resolutions 112). An exponentially decaying (i.e., increasing) function may be modeled to determine s (i.e., resolution scaling factor) as a function of a target bitrate b:

$$s(b) = 1 - s_0 e^{-Kb}$$

$1-s_0$ is the value of s at b=0, and K determines a rate of decay. The rate of decay, K, may be directly proportional to temporal characteristics of the given segment and inversely proportional to the spatial characteristics of the given segment, thus K may be modeled as follows:

$$K = \frac{\Gamma_{MA}(f) * h}{E}$$

where $\Gamma_{MA}(f)$ is the proportion constant Menon Amirpour resolution scaling coefficient, which depends on a video frame rate (f). Thus, another representation of the resolution scaling factor as a function of a target bitrate b may be:

$$s(b) = 1 - s_0 e^{-\frac{\Gamma_{MA}(f)*h*b}{E}}$$

Given a bitrate ladder (e.g., bitrates 110 and resolutions 112), determining $\Gamma_{MA}$ may include evaluating the half-life of the (1−s) function, as in the bitrate when (1−s) becomes. (1−s) is an exponentially decaying (i.e., decreasing) function whose half-life may be represented as:

$$b_{\frac{1}{2}} = \frac{\ln(2)}{K}$$

Thus, $\Gamma_{MA}$ may be determined as:

$$\Gamma_{MA} = \frac{\ln(2) * E}{h * b_{\frac{1}{2}}}$$

$\Gamma_{MA}$ values obtained for training sequences of each framerate then may be averaged to determine $\Gamma_{MA}(f)$. Based on the $\Gamma_{MA}$ for each framerate, convex-hull prediction 104 may predict a resolution scaling factor (s) for a given segment using the extracted spatial energy feature E and average temporal energy h. An example convex-hull prediction algorithm may be represented as follows:

---
Algorithm 1: Convex-hull prediction algorithm
---
    Inputs:
      f : number of video frames per second
      S : set of all resolution scaling factors $\tilde{s}$
      B : set of all target bitrates b
    Output: s(b) ∀ b ∈ B
    Step 1: Compute E, h features.
    Step 2: Determine $\hat{s}(b)$.
$$\hat{s}(b) = 1 - s_0 e^{-\frac{\Gamma_{MA}(f)*h*b}{E}}$$
    Step 3: Map $\hat{s}(b)$ to the closest $\tilde{s}$ to get s(b).

---

In Algorithm 1, Step 2 may generate a fraction between 0 and 1. This fraction may be mapped to a nearest value in the set s. In an example, if s={0.25, 0.5, 1}, a resulting fraction of 0.3 may be mapped to s(b)=0.25, as that is the closest value in the set s.

In an example, s=1 denotes a 2160p spatial resolution and $$s = \frac{1}{6}$$

denotes a 360p spatial resolution for a given segment. In this example, $$s = \frac{1}{6}$$

is the minimum, the initial condition, $$s(b=0) = \frac{1}{6}$$

may be assumed, and thus, $$s_0 = \frac{5}{6}.$$

The lower resolution sources may be generated from the original video source by applying bi-cubic scaling (e.g., using FFmpeg). In this example, $\Gamma_{MA}(30)$, $\Gamma_{MA}(50)$, and $\Gamma_{MA}(60)$ may be trained as 0.06, 0.03, and 0.02, respectively. Given this example, increases in coding efficiency over fixed bitrate ladder encoding may range from approximately one percent to over 50% (e.g., −1% to −70% $BDR_P$ and/or $BDR_V$), with average efficiencies ranging from approximately 20% to 30% (e.g., −20% to −30% $BDR_P$ and/or $BDR_V$). Bjøntegaard delta rates $BDR_P$ and $BDR_V$ may represent average increases in bitrate of a representation compared with that of a fixed bitrate ladder encoding to maintain the same PSNR and VMAF, respectively, with negative BDR indicating a gain in coding efficiency over fixed bitrate ladder encoding.

In some examples, bitrate-resolution pairs 105 determined by convex-hull prediction 104 may be provided to encoding set generation module 106 to generate target encoding set 107 for encoding. Live per-title encoding module 108 may be configured to perform per-title encoding of target encoding set 107 (e.g., using ×264, ×265, or other encoding with veryfast or other encoding profile), target encoding set 107 representing selected bitrate resolution pairs 105 for each video segment, without having to per-title encode a full bitrate ladder (e.g., bitrates 110) for all resolutions 112. In some examples, E and h feature extraction (e.g., by convex-hull prediction 104) and encoding (e.g., by live per-title encoding 108) may be scheduled as parallel processes.

Figure 2A:
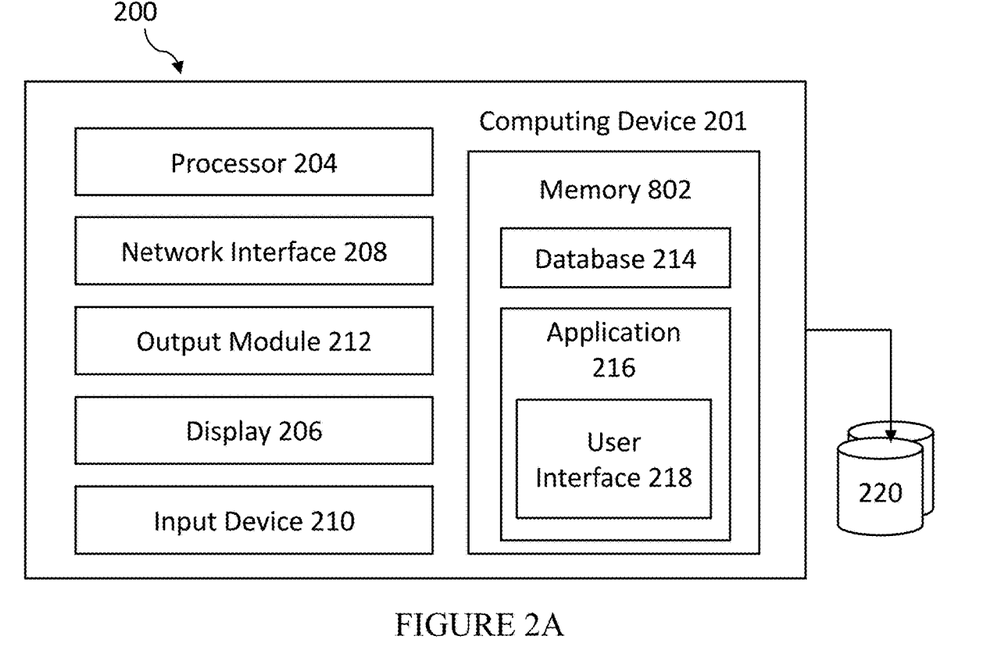
FIG. 2A is a simplified block diagram of an exemplary computing system configured perform steps of the method illustrated in FIG. 3, in accordance with one or more embodiments.
Figure 2B:
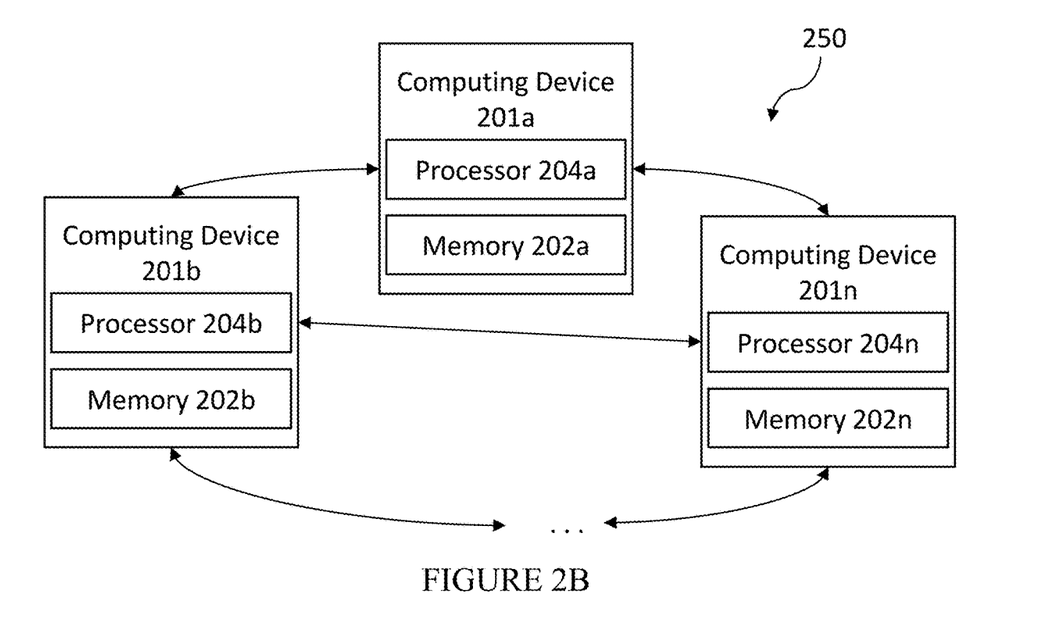
FIG. 2B is a simplified block diagram of an exemplary distributed computing system implemented by a plurality of the computing devices, in accordance with one or more embodiments.
Figure 3:
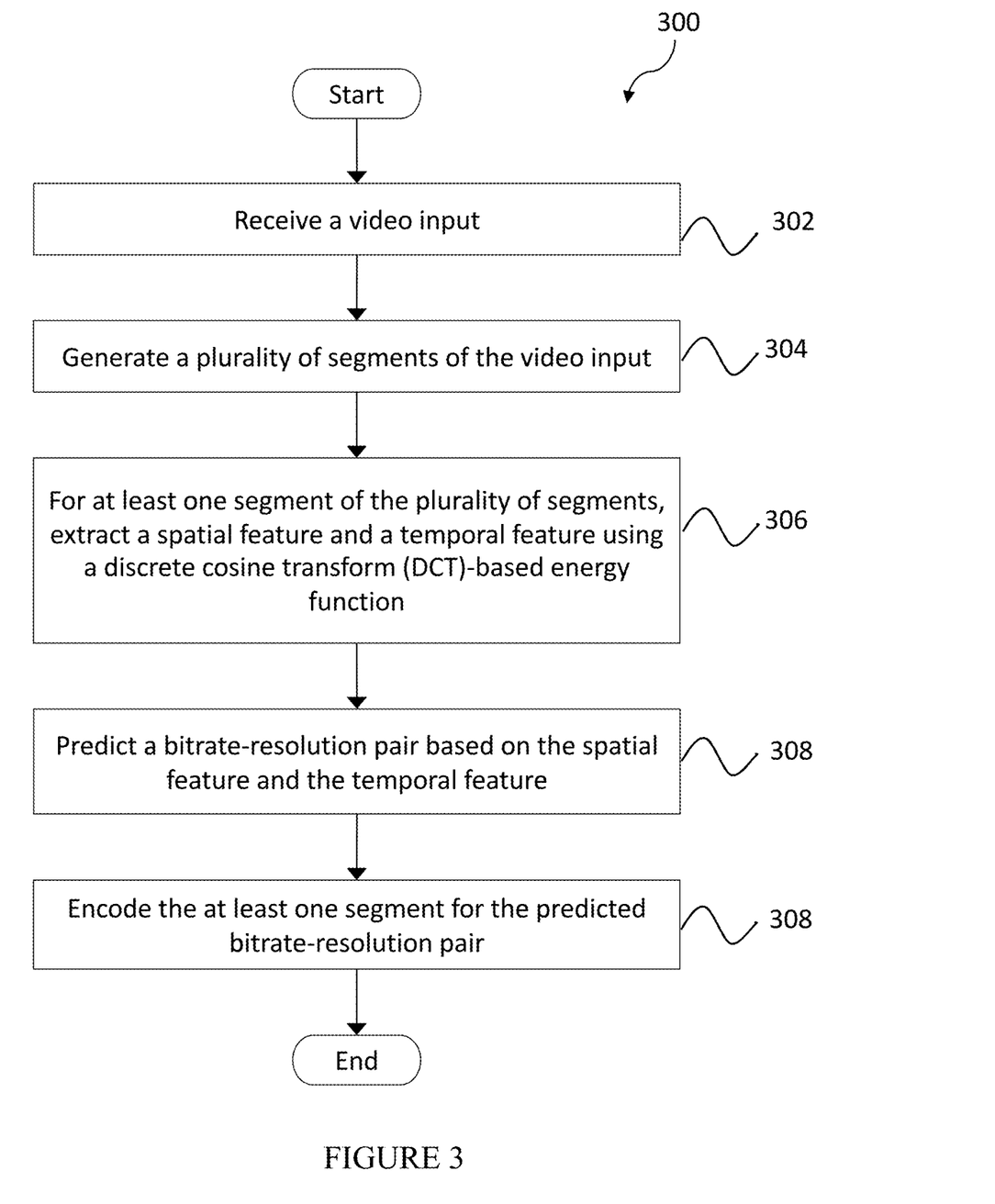
FIG. 3 is a flow diagram illustrating an exemplary method for live per-title encoding, in accordance with one or more embodiments.

FIG. 2A is a simplified block diagram of an exemplary computing system configured to perform steps of the method illustrated in FIG. 3, in accordance with one or more embodiments. In one embodiment, computing system 200 may include computing device 201 and storage system 220. Storage system 220 may comprise a plurality of repositories and/or other forms of data storage, and it also may be in communication with computing device 201. In another embodiment, storage system 220, which may comprise a plurality of repositories, may be housed in one or more of computing device 201. In some examples, storage system 220 may store SR networks, video data, bitrate ladders, instructions, programs, and other various types of information as described herein. This information may be retrieved or otherwise accessed by one or more computing devices, such as computing device 201, in order to perform some or all of the features described herein. Storage system 220 may comprise any type of computer storage, such as a hard drive, memory card, ROM, RAM, DVD, CD-ROM, write-capable, and read-only memories. In addition, storage system 220 may include a distributed storage system where data is stored on a plurality of different storage devices, which may be physically located at the same or different geographic locations (e.g., in a distributed computing system such as system 250 in FIG. 2B). Storage system 220 may be networked to computing device 201 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 201, which in some examples may be included in mobile device 201 and in other examples may be included in server 108, also may include a memory 202. Memory 202 may comprise a storage system configured to store a database 214 and an application 216. Application 216 (e.g., per) may include instructions which, when executed by a processor 204, cause computing device 201 to perform various steps and/or functions (e.g., implementing an SR-based ABR algorithm), as described herein. Application 216 further includes instructions for generating a user interface 218 (e.g., graphical user interface (GUI)). Database 214 may store various algorithms (e.g., SR-based ABR algorithms) and/or data, including neural networks (e.g., convolutional neural networks trained to perform SR techniques) and data regarding bitrates, videos, device characteristics, SR network performance, among other types of data. Memory 202 may include any non-transitory computer-readable storage medium for storing data and/or software that is executable by processor 204, and/or any other medium which may be used to store information that may be accessed by processor 204 to control the operation of computing device 201.

Computing device 201 may further include a display 206 (e.g., similar to display 106), a network interface 208, an input device 210, and/or an output module 212. Display 206 may be any display device by means of which computing device 201 may output and/or display data. Network interface 208 may be configured to connect to a network using any of the wired and wireless short range communication protocols described above, as well as a cellular data network, a satellite network, free space optical network and/or the Internet. Input device 210 may be a mouse, keyboard, touch screen, voice interface, and/or any or other hand-held controller or device or interface by means of which a user may interact with computing device 201. Output module 212 may be a bus, port, and/or other interfaces by means of which computing device 201 may connect to and/or output data to other devices and/or peripherals.

In one embodiment, computing device 201 is a data center or other control facility (e.g., configured to run a distributed computing system as described herein), and may communicate with a media playback device (e.g., mobile device 101). As described herein, system 200, and particularly computing device 201, may be used for video playback, running an SR-based ABR application, upscaling video using an SR network, providing feedback to a server, and otherwise implementing steps in a device-adaptive SR-based approach to adaptive streaming, as described herein. Various configurations of system 200 are envisioned, and various steps and/or functions of the processes described below may be shared among the various devices of system 200 or may be assigned to specific devices.

FIG. 2B is a simplified block diagram of an exemplary distributed computing system implemented by a plurality of the computing devices, in accordance with one or more embodiments. System 250 may comprise two or more computing devices 201a-n. In some examples, each of 201a-n may comprise one or more of processors 204a-n, respectively, and one or more of memory 202a-n, respectively. Processors 204a-n may function similarly to processor 204 in FIG. 2A, as described above. Memory 202a-n may function similarly to memory 202 in FIG. 2A, as described above.

Figure 4A:
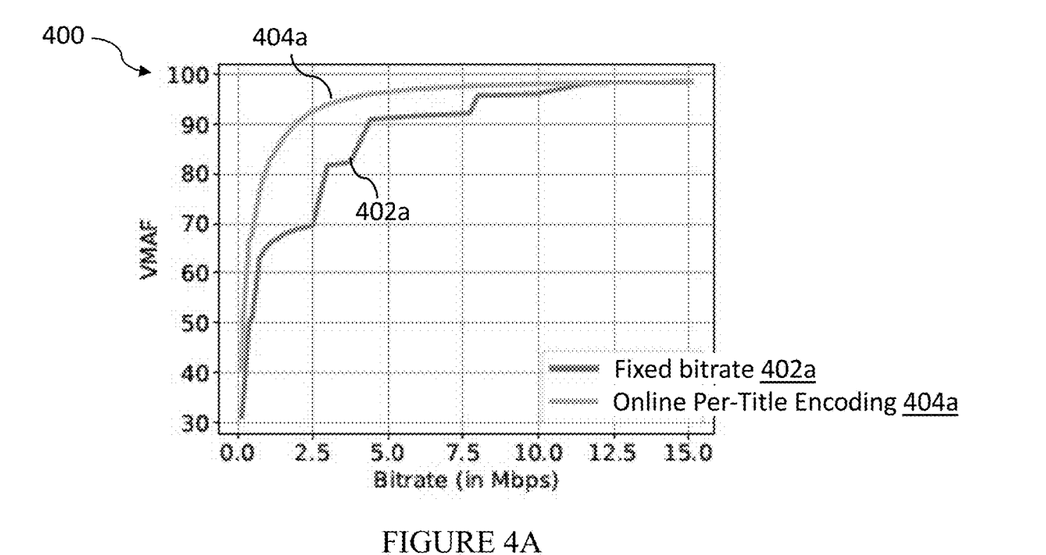
FIGS. 4A-4B are charts illustrating rate distortion (RD) curves of encoding exemplary video segments using an online per-title encoding system as compared to a fixed bitrate ladder, in accordance with one or more embodiments.
Figure 4B:
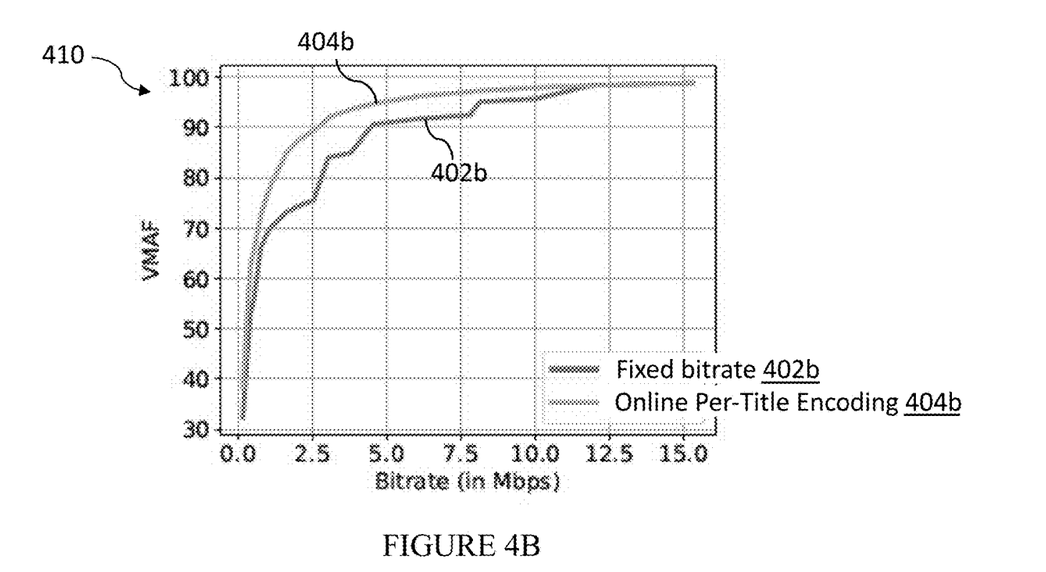

FIGS. 4A-4B are charts illustrating rate distortion (RD) curves of encoding exemplary video segments using an online per-title encoding system as compared to a fixed bitrate ladder, in accordance with one or more embodiments. Charts 400 and 410 show VMAF results for a range of bitrates, lines 404a-b showing results for online per-title encoding, as described herein, and lines 402a-b showing results for conventional fixed bitrate ladder encoding. As shown, online per-title encoding results 404a-b show significant improvement (e.g., consistently higher VMAF, which results in improved QoE) over a wide range of bitrates.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for online per-title encoding, comprising:
receiving a video input;
generating a plurality of segments of the video input;
for at least one segment of the plurality of segments of the video input, extracting a spatial feature and a temporal feature;

predicting a bitrate-resolution pairs based on the spatial feature and the temporal feature, using a discrete cosine transform (DCT)-based energy function, the bitrate-resolution pairs indicating an optimal resolution for each of a plurality of target bitrates; and per-title encoding the at least one segment for the predicted bitrate-resolution pairs, wherein predicting the bitrate-resolution pair comprises determining a resolution scaling factor for each bitrate in a set of bitrates.

2. The method of claim 1, further comprising generating a target encoding set based on the predicted bitrate-resolution pairs for the per-title encoding the at least one segment.

3. The method of claim 1, wherein predicting the bitrate-resolution pair includes computing a rate of decay using a video frame rate and a Menon Amirpour resolution scaling coefficient.

4. The method of claim 1, wherein predicting the bitrate-resolution pair is further based on a number of video frames per second.

5. The method of claim 1, wherein the set of resolution scaling factor ranges from 1/6 to 1.

6. The method of claim 1, wherein the bitrate ranges from 145 kbps to 1.6 Mbps.

7. The method of claim 1, wherein the spatial feature comprises a low-complexity spatial feature.

8. The method of claim 1, wherein the temporal feature comprises a low-complexity temporal feature.

9. The method of claim 1, wherein the spatial feature is determined as a function of a number of blocks per frame and a number of frames in the at least one segment.

10. The method of claim 1, wherein the temporal feature is determined as a function of a sum of absolute differences of each frame's block-wise spatial energy compared to a previous frame's block-wise spatial energy.

11. The method of claim 1, further comprising providing a live stream of the plurality of segments of the video input using the per-title encoding of the at least one segment.

12. A system for online per-title encoding, comprising:
a memory comprising non-transitory computer-readable storage medium configured to store a set of bitrates, a set of resolutions, and a machine learning model;
one or more processors configured to execute instructions stored on the non-transitory computer-readable storage medium to:
receive a video input;
generate a plurality of segments of the video input;
for at least one segment of the plurality of segments of the video input, extract a spatial feature and a temporal feature;
determine a resolution scaling factor, by the machine learning model, for each bitrate of a set of target bitrates;
predict a bitrate-resolution pair, by the machine learning model, based on the spatial feature and the temporal feature, using a discrete cosine transform (DCT)-based energy function; and
per-title encode the at least one segment for the predicted bitrate-resolution pair.

13. The system of claim 12, wherein the machine learning model is configured to receive as inputs at least a set of resolution scaling factors and the set of target bitrates.

14. The system of claim 12, wherein the machine learning model is configured to receive as input a number of video frames per second of the video input.

15. The system of claim 12, wherein the machine learning model comprises a neural network.

* * * * *